(12) United States Patent
Webman et al.

(10) Patent No.: US 8,150,800 B2
(45) Date of Patent: Apr. 3, 2012

(54) ADVANCED CLOCK SYNCHRONIZATION TECHNIQUE

(75) Inventors: Erez Webman, Petach-Tikva (IL); Yoram Novick, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 1188 days.

(21) Appl. No.: 11/692,659

(22) Filed: Mar. 28, 2007

(65) Prior Publication Data

US 2008/0243950 A1 Oct. 2, 2008

(51) Int. Cl.
*G06F 7/00* (2006.01)
*G06F 17/00* (2006.01)

(52) U.S. Cl. ........ 707/609; 707/610; 709/248; 714/707; 714/731; 714/775

(58) Field of Classification Search .................. None
See application file for complete search history.

(56) References Cited

U.S. PATENT DOCUMENTS

| | | |
|---|---|---|
| 5,504,861 A | 4/1996 | Crockett et al. |
| 5,592,618 A | 1/1997 | Micka et al. |
| 5,657,440 A | 8/1997 | Micka et al. |
| 5,682,513 A | 10/1997 | Candelaria et al. |
| 6,144,999 A | 11/2000 | Khalidi et al. |
| 6,502,205 B1 | 12/2002 | Yanai et al. |
| 6,539,396 B1 * | 3/2003 | Bowman-Amuah ......... 707/769 |
| 6,711,693 B1 * | 3/2004 | Golden et al. ............... 713/400 |
| 6,993,539 B2 | 1/2006 | Federwisch et al. |
| 7,028,147 B2 | 4/2006 | Wu et al. |
| 7,136,882 B2 * | 11/2006 | Collins et al. ......................... 1/1 |
| 7,152,077 B2 | 12/2006 | Veitch et al. |
| 7,203,732 B2 | 4/2007 | McCabe et al. |
| 7,237,076 B2 | 6/2007 | Nakano et al. |
| 7,243,115 B2 | 7/2007 | Manley et al. |
| 7,325,109 B1 | 1/2008 | Muppalaneni et al. |
| 7,467,265 B1 | 12/2008 | Tawri et al. |
| 7,539,976 B1 * | 5/2009 | Ousterhout et al. .......... 717/120 |
| 7,571,268 B2 | 8/2009 | Kern et al. |
| 7,606,841 B1 | 10/2009 | Ranade |
| 7,624,109 B2 | 11/2009 | Testardi |
| 7,653,668 B1 | 1/2010 | Shelat et al. |

(Continued)

FOREIGN PATENT DOCUMENTS

EP 1617330 A2 1/2006

OTHER PUBLICATIONS

Mills, David L., "Network Time Protocol (version 3) Specification, Implementation and Analysis," Network Working Group, XP002935527, Mar. 1, 1992, pp. i-vii and 1-113.

(Continued)

*Primary Examiner* — Mohammad Ali
*Assistant Examiner* — Angelica Ruiz
(74) *Attorney, Agent, or Firm* — Cesari and McKenna, LLP

(57) ABSTRACT

An advanced clock synchronization technique is adapted for use with a replication service in a data backup and recovery storage environment. The storage environment includes a plurality of source storage systems and target storage systems, wherein the source storage systems are illustratively embodied as source replication nodes. The advanced clock synchronization technique establishes a software-only, loosely-accurate global clock based on a timestamp and an associated error boundary. Notably, the timestamp and its error boundary are used as global clock information to enable synchronization (i.e., ordering of storage requests) among the source replication nodes and/or the target storage systems, thereby ensuring consistent replication of the storage requests on the target storage systems.

22 Claims, 8 Drawing Sheets

U.S. PATENT DOCUMENTS

| | | | |
|---|---|---|---|
| 7,885,923 B1 | 2/2011 | Tawri et al. | |
| 2002/0039370 A1 | 4/2002 | Elliot | |
| 2003/0018878 A1 | 1/2003 | Dorward et al. | |
| 2003/0065873 A1* | 4/2003 | Collins et al. | 711/100 |
| 2003/0182313 A1 | 9/2003 | Federwisch et al. | |
| 2003/0204692 A1 | 10/2003 | Tamer et al. | |
| 2004/0039774 A1* | 2/2004 | Xu et al. | 709/203 |
| 2004/0139367 A1 | 7/2004 | Boyd et al. | |
| 2004/0205372 A1* | 10/2004 | Moser et al. | 714/1 |
| 2004/0250029 A1 | 12/2004 | Ji et al. | |
| 2004/0260736 A1 | 12/2004 | Kern et al. | |
| 2005/0015413 A1* | 1/2005 | Teodosiu et al. | 707/201 |
| 2005/0050115 A1* | 3/2005 | Kekre | 707/204 |
| 2005/0055357 A1* | 3/2005 | Campbell | 707/100 |
| 2005/0071708 A1 | 3/2005 | Bartfai et al. | |
| 2005/0097260 A1* | 5/2005 | McGovern et al. | 711/100 |
| 2005/0144202 A1 | 6/2005 | Chen | |
| 2005/0154786 A1 | 7/2005 | Shackelford | |
| 2006/0006918 A1* | 1/2006 | Saint-Laurent | 327/295 |
| 2006/0015507 A1 | 1/2006 | Butterworth et al. | |
| 2006/0059322 A1 | 3/2006 | Poston | |
| 2006/0095480 A1 | 5/2006 | Vaughn et al. | |
| 2006/0106895 A1 | 5/2006 | Vaughn et al. | |
| 2006/0173985 A1* | 8/2006 | Moore | 709/223 |
| 2006/0200761 A1* | 9/2006 | Judd et al. | 715/517 |
| 2007/0022264 A1 | 1/2007 | Bromling et al. | |
| 2007/0165549 A1 | 7/2007 | Surek et al. | |
| 2007/0174687 A1* | 7/2007 | Graham et al. | 714/13 |
| 2007/0185937 A1 | 8/2007 | Prahlad et al. | |
| 2007/0185938 A1 | 8/2007 | Prahlad et al. | |
| 2007/0239950 A1* | 10/2007 | Kern et al. | 711/162 |
| 2007/0288708 A1 | 12/2007 | Saha et al. | |
| 2008/0162594 A1 | 7/2008 | Poston | |
| 2008/0243951 A1 | 10/2008 | Webman et al. | |
| 2008/0243952 A1 | 10/2008 | Webman et al. | |
| 2008/0288646 A1* | 11/2008 | Hasha et al. | 709/228 |
| 2010/0169275 A1 | 7/2010 | Chen et al. | |
| 2010/0250497 A1 | 9/2010 | Redlich et al. | |

OTHER PUBLICATIONS

"Notification of Transmittal of the International Search Report and the Written Opinion of the International Searching Authority, or the Declaration," International Filing Date: Mar. 20, 2008, International Application No. PCT/US2008/003692, Applicant: Network Appliance, Inc., Date of Mailing: Nov. 5, 2008, pp. 1-17.

Network Appliance, Inc., "Notification of Transmittal of the International Search Report and the Written Opinion of the International Searching Authority, or the Declaration," International Filing Date: Mar. 19, 2008, International Application No. PCT/US2008/003554, Date of Mailing: Aug. 26, 2008, pp. 1-14.

Network Appliance, Inc., "Notification of Transmittal of the International Search Report and the Written Opinion of the International Searching Authority, or the Declaration," International Filing Date: Mar. 19, 2008, International Application No. PCT/US2008/003612, Date of Mailing: Nov. 5, 2008, pp. 1-17.

* cited by examiner

ADVANCED CLOCK SYNCHRONIZATION TECHNIQUE

CROSS-REFERENCE TO RELATED APPLICATION

The present invention is related to the following commonly assigned U.S. patent application Ser. No. 11/692,668 titled, Write Ordering Style Asynchronous Replication Utilizing a Loosely-Accurate Global Clock and U.S. patent application Ser. No. 11/692,683 titled, Group Stamping Style Asynchronous Replication Utilizing a Loosely-Accurate Global Clock, each of which is filed herewith.

FIELD OF THE INVENTION

The present invention relates to clock synchronization and, more specifically, to an advanced clock synchronization technique adapted for use with replication services.

BACKGROUND OF THE INVENTION

Replication is typically employed as part of a data backup and recovery storage strategy and, as such, denotes the movement of data from a source storage space of a source domain to a target storage space of a target domain via a communications network (e.g., a computer network) in such a way that enables recovery of applications from the target storage space. As used herein, recovery denotes loading of the applications on possibly different hosts (e.g., computers) where they can access the target storage space, instead of the source storage space, resulting in the applications loaded to a valid state. Also, storage space denotes any storage medium having addresses that enable data to be accessed in a stable way and, as such, may apply to file system access, block access and any other storage access means.

The source domain contains at least the source storage space, but may also contain the hosts, a switching fabric and any source replication components situated outside of those components. In this context, a component may either be a physical entity (e.g., a special replication appliance) and/or software entity (e.g., a device driver). In remote disaster recovery, for example, the source domain includes an entire geographical site, but may likewise span multiple geographical sites. The target domain includes all of the remaining components relevant for replication services, including the target storage space. In addition, a replication facility includes components that may be located in both the source and target domains.

The replication facility typically has at least one component, i.e., a write interception component, which intercepts storage requests (e.g., write operations or "writes") issued by a host to the source storage space, prior to sending the intercepted writes to the target storage space. The write interception component is typically embedded within a computing unit configured as a source replication node. When issuing a write, an application executing on the host specifies an address on the storage space, as well as the contents (i.e., write data) with which the storage space address is to be set. The write interception component may be implemented in various locations in the source domain depending on the actual replication service; such implementations may include, e.g., a device driver in the host, logic in the switching fabric, and a component within the source domain, e.g., a source storage system. The write interception component is typically located "in-band", e.g., between the host and the source storage system, although there are environments in which the component may be located "out-of-band", where a separate physical component, such as an appliance server, in the source domain receives duplicate writes by utilizing, e.g., an in-band splitter.

Synchronous replication is a replication service wherein a write is not acknowledged until the write data associated with the write is processed by the source storage space, propagated to the target domain and persistently stored on the target storage space. An advantage of synchronous replication is the currency of the target domain data; that is, at any point in time, the writes stored on the target domain are identical to the source domain. However a disadvantage of this replication service is the latency or propagation delay associated with communicating the writes to the target domain, which limits the synchronous replication service in terms of distance, performance and scalability.

An asynchronous replication service reduces such latency by requiring that the write only be processed by the source storage space without having to wait for persistent storage of the write on the target storage space. In other words, the write is acknowledged once its associated write data is processed by the source storage space; afterwards, the write (and write data) are propagated to the target domain. Thus, this replication service is not limited by distance, performance or scalability and, therefore, is often preferred over synchronous replication services. A disadvantage of the asynchronous replication service, though, is the possibility of incurring data loss should the source storage space fail before the write data has been propagated and stored on the target storage space.

For example, assume the source storage system is one of many independent (non-coordinated) storage systems that span various geographical locations of a source domain. Further, assume that a host application or multiple (coordinated) host applications issue writes to all of the source storage systems for storage on their storage spaces. These source storage spaces must be replicated consistently on a target domain such that, if a disaster arises, storage on the target domain can be recovered in a manner that maintains the order of writes issued to the source storage systems by the host(s).

Assume further that the replication service replicates writes consistently from the source storage systems to a plurality of target storage systems of the target domain. As a result, there may be a plurality of independent replication streams, e.g., one replication stream from a first source storage system to a first target storage system and one stream from a second source storage system to a second target storage system. These independent and non-coordinated replication streams are asynchronously replicated at a target storage space of the target domain. In the event of a disaster, a situation may arise where the first target storage system is recovered to a first, previous point in time and the second target storage system is recovered to a second, previous point in time. Accordingly, the aggregated content of the target storage space on the target domain is corrupted. The present invention is directed, in part, to solving this problem by enabling synchronization among the target storage spaces.

Often, a source domain having multiple hosts and/or multiple source storage systems may include only one source replication node (i.e., one write interception component) configured to intercept all writes associated with a consistency group. As used herein, a consistency group comprises storage space that requires consistent replication at a target domain. For example, assume that a large data center is configured with many source storage systems configured to serve many hosts, wherein the source storage systems cooperate to maintain a consistency group. If all write traffic is directed to the single write interception component, a substantial scalability issue arises because the interception component will not practically be able to sustain the entire traffic.

Now assume that a consistency group is configured to span multiple geographical site locations such as, e.g., among several small data centers geographically dispersed throughout a country or a plurality of countries. Here, the main reason for not using a single write interception component is not necessarily the scalability issue as much as the substantial latency introduced by such a configuration. This may necessitate either use of smaller consistency groups, which facilitates reliable and consistent group recovery on the target domain, or acceptance of large latencies and performance impact, which is undesirable. Therefore, such configurations may dictate the use of multiple write interception components.

Yet, certain prior replication solutions such as, e.g., write-level ordering asynchronous replication solutions, have been generally unable to accommodate configurations employing multiple write interception components. A possible exception is the XRC Asynchronous Replication service available from IBM Corporation, which ensures synchronization among multiple write interception components through the use of a fine grained, extremely accurate, hardware-based global clock facility. The XRC service uses a dedicated, hardware mechanism to realize such an accurate global clock and, as such, is generally tailored to mainframe computers. That is, the ability to set a time that is extremely accurate is guaranteed by the hardware mechanism built into mainframe technology. Such a mechanism is expensive and generally not deployable by systems running open, general-purpose operating systems. Furthermore, such mainframe technology may not be practically deployed in distributed environments because of latency issues, thereby rendering the hardware mechanism ineffective when servicing a consistency group that spans multiple geographical sites.

SUMMARY OF THE INVENTION

The present invention overcomes the disadvantages of the prior art by providing an advanced clock synchronization technique adapted for use with a replication service in a data backup and recovery storage environment. The storage environment includes a plurality of source storage systems and target storage systems, wherein the source storage systems are illustratively embodied as source replication nodes. The advanced clock synchronization technique establishes a software-only, loosely-accurate global clock based on a timestamp and an associated error boundary. Notably, the timestamp and its error boundary are used as global clock information to enable synchronization (i.e., ordering of storage requests) among the source replication nodes and/or the target storage systems, thereby ensuring consistent replication of the storage requests on the target storage systems.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
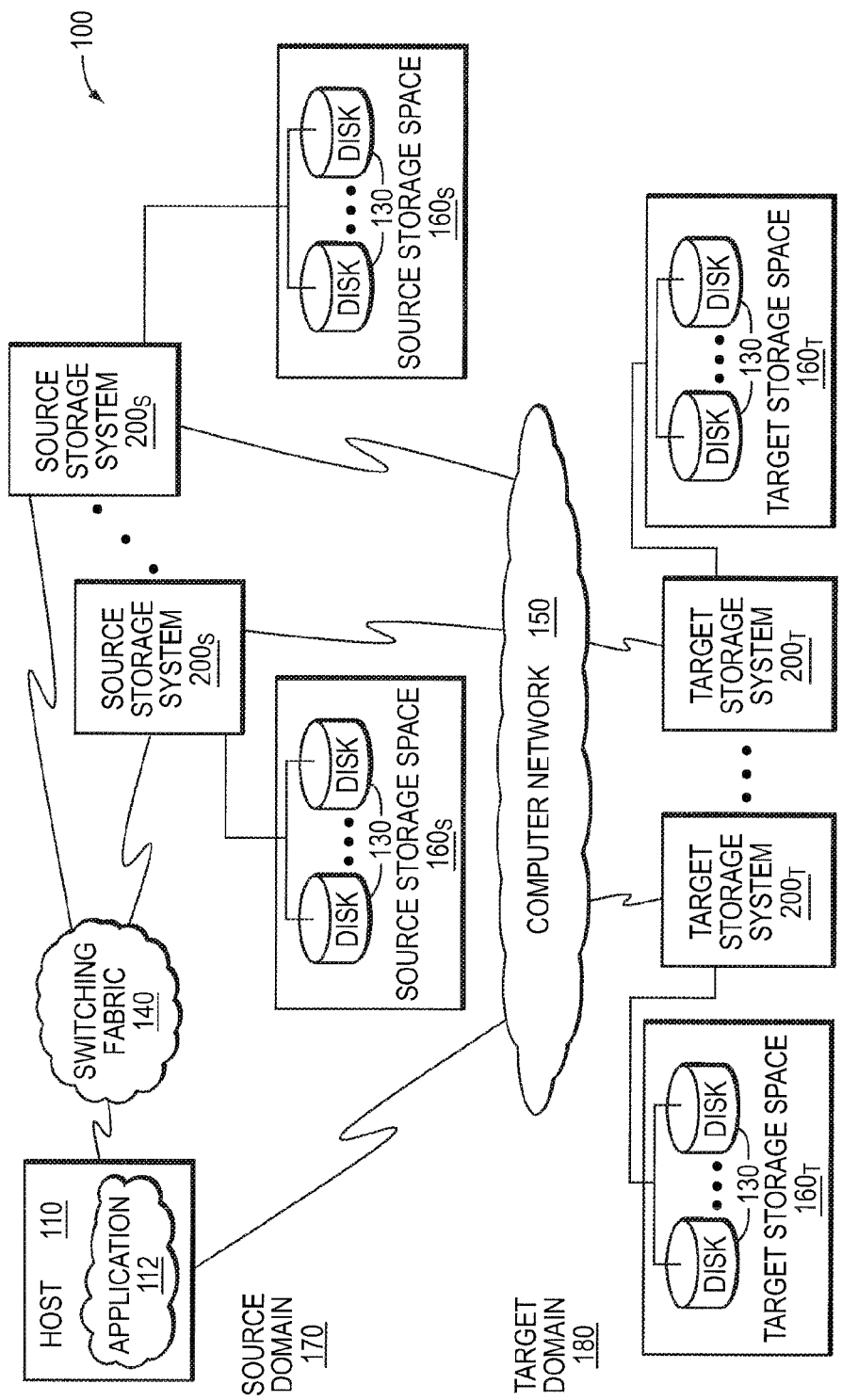
FIG. 1 is a schematic block diagram of an environment including a plurality of storage systems that may be advantageously used with the present invention.

FIG. 1 is a schematic block diagram of an environment 100, such as a data backup and recovery storage environment, which includes a plurality of storage systems 200, such as source storage systems $200_S$ and target storage systems $200_T$, that may be advantageously used with the present invention. Each storage system is a computer that provides storage service relating to the organization of information on storage devices, such as disks 130. The disks 130 of each storage system $200_{S,T}$ cooperate to define a storage space $160_{S,T}$ on each system. The source storage systems are connected to one or more hosts 110 over a switching fabric 140, which may comprise a conventional Ethernet or Fibre Channel (FC) switch.

In an illustrative embodiment described herein, the hosts 110, source storage systems $200_S$ and source storage spaces $160_S$ are organized as components of a source domain 170, while the target storage systems $200_T$ and their target storage spaces $160_T$ are organized as components of a target domain 180. The source domain components are coupled to the target domain components over a computer network 150, which may comprise a plurality of point-to-point connections or communication links of, e.g., a wide area network embodied as an Ethernet network or a FC network. The components of each domain may communicate over network 150 by exchanging discrete frames or packets of data according to pre-defined protocols, such as the Transmission Control Protocol/Internet Protocol (TCP/IP).

Each host 110 may be a general-purpose computer configured to execute applications 112. Moreover, each host 110 may interact with each storage system 200 in accordance with a client/server model of information delivery. That is, the client (host) may request the services of the server (storage system), and the storage system may return the results of the services requested by the host, by exchanging packets over, e.g., the switching fabric 140. The hosts may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over FC (FCP), when accessing information in the form of blocks.

Figure 2:
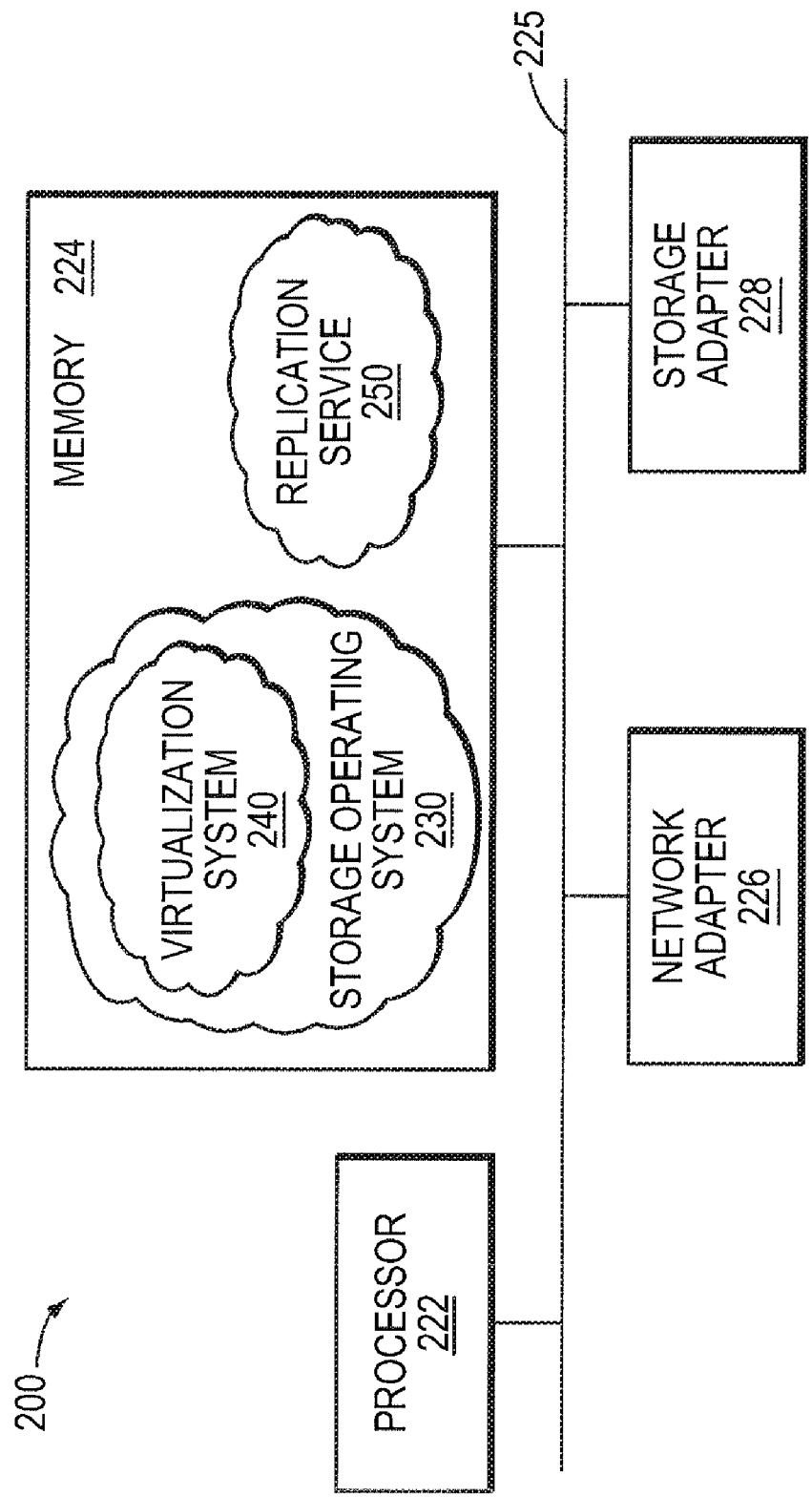
FIG. 2 is a schematic block diagram of a storage system that may be advantageously used with the present invention.

Is FIG. 2 is a schematic block diagram of a storage system 200 that may be advantageously used with one or more embodiments described herein as, e.g., a source storage system $200_S$ or target storage system $200_T$. Each storage system 200 comprises a processor 222, a memory 224, a network adapter 226 and a storage adapter 228 interconnected by a system bus 225. The network adapter 226 comprises the mechanical, electrical and signaling circuitry needed to connect the storage system 200 to the switching fabric 140 or computer network 150. The storage system 200 also includes a storage operating system 230 that preferably implements a virtualization system 240 to logically organize the information as a hierarchical structure of data containers, such as directories, files and logical units (luns). The virtualization system may be abstracted through the use of a database management system, a volume manager or, as described herein, a file system.

In an illustrative embodiment, the memory 224 comprises storage locations that are addressable by the processor and adapters for storing software programs and data structures associated with the present invention. The processor and adapters may, in turn, comprise processing elements and/or logic adapted to execute the software programs and manipulate the data structures. Storage operating system 230, portions of which is typically resident in memory and executed by the processing elements, functionally organizes the system 200 by, inter alia, invoking storage operations in support of processes, modules and/or services executing on the storage system. These processes, modules and/or services may include, e.g., synchronous and/or asynchronous replication service 250. It will be apparent to those skilled in the art that other processing and memory means, including various computer readable media, may be used to store and execute program instructions pertaining to the inventive technique described herein.

The storage adapter 228 cooperates with the storage operating system 230 executing on the system 200 to access information requested by a host (or user). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, is the information is preferably stored on the disks 130. The storage adapter includes input/output (I/O) interface circuitry that couples to the disks over an I/O interconnect arrangement, such as a conventional high-performance, FC serial link topology.

Storage of information on each storage system $200_{S,T}$ is preferably implemented as a collection of physical storage disks 130 cooperating to define an overall logical arrangement of storage space $160_{S,T}$ on the system. To facilitate access to the disks 130, the storage operating system 230 implements a file system that cooperates with virtualization modules to provide virtualization system 240 that "virtualizes" the storage space 160 provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named luns.

In an illustrative embodiment, application 112 executes in host 110 to issue storage requests to access data containers exported by source storage systems $200_S$ of the source domain 170. The virtualization system 240 of each source storage system transposes the storage requests into file system requests for local storage on the source storage space $160_S$, to thereby serve the storage requests issued by the host 110. The storage requests are illustratively write operations ("writes"). A write interception entity or component intercepts the writes and replicates those writes to one or more target storage systems $200_T$ of the target domain 180, where the intercepted writes are stored for, e.g., data backup and/or disaster recovery purposes. The writes are thereafter consistently stored on the target storage space $160_T$ such that, if a disaster arises, the storage on that storage space can be recovered in a manner that maintains the order of writes issued to the source storage systems by the host.

The write interception component may reside (i) in the host 110 (e.g., embodied as a device driver), (ii) within the switching fabric 140 (e.g., embodied as a software module in the network switch) or, as described herein, (iii) in the source storage system $200_S$, such that the component may intercept the writes in block-level or file-level semantics. A source replication node is the computing unit in which the write interception component is embedded. For example, if the write interception component is implemented as a device driver inside host 110, the host is the source replication node, whereas if the component is located out-of-band, i.e., within an appliance server, the appliance server is the source replication node.

In accordance with the present invention, an advanced clock synchronization technique is adapted for use with a replication service in a data backup and recovery storage environment. The storage environment includes a plurality of source storage systems and target storage systems, wherein the source storage systems are illustratively embodied as source replication nodes. The advanced clock synchronization technique establishes a software-only, loosely-accurate global clock based on a timestamp and an associated error boundary using, e.g., hardware clock and clock node components described herein. The established clock is a loosely-accurate global clock because, as noted, it is difficult to establish an extremely accurate, fined-grain global clock using general-purpose host systems and commercially-available storage systems, particularly if these systems are geographically dispersed. Notably, the timestamp and its error boundary are used as global clock information to enable synchronization (i.e., ordering of storage requests) among the source replication nodes and/or the target storage systems, thereby ensuring consistent replication of the storage requests on the target storage systems.

Figure 3:
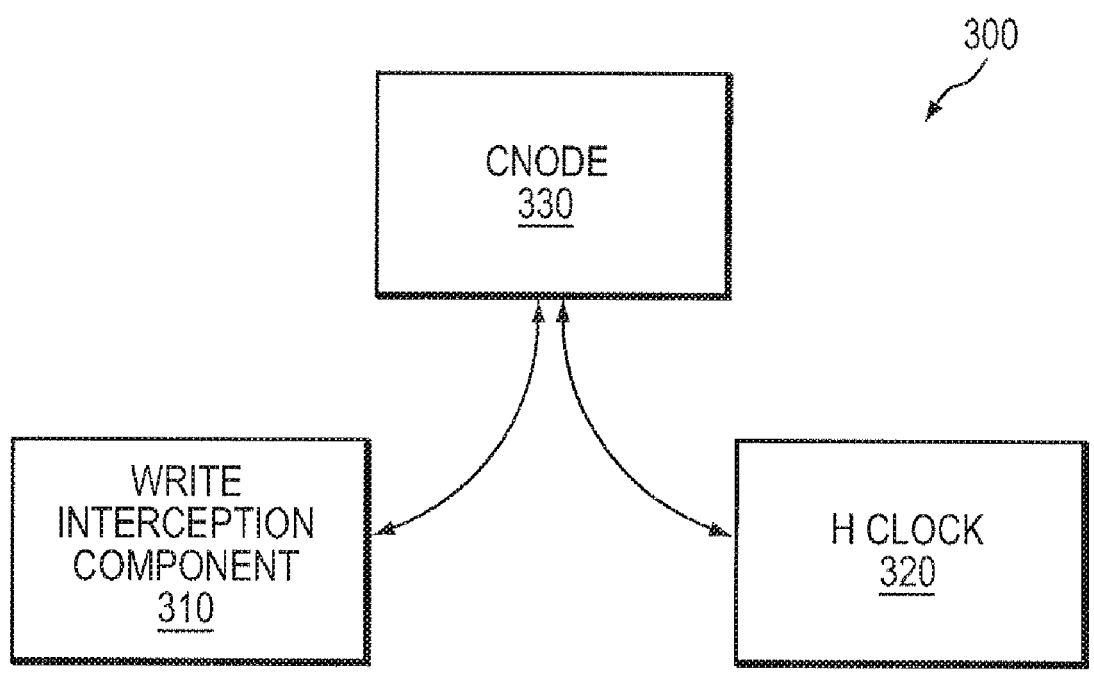
FIG. 3 is a schematic block diagram of a source replication node that may be advantageously used with the present invention.

FIG. 3 is a schematic block diagram of a source replication node 300 that may be advantageously used with the present invention. As noted, a source replication node (SRN) is the computing unit in which a write interception component is embedded. In an illustrative embodiment described herein, the write interception component 310 is located in a source storage system $200_S$ and is embodied as a software module disposed over the virtualization system 240; as such, each source storage system $200_S$ may illustratively be an SRN 300. Each SRN also contains a hardware clock (HClock) component 320 and a clock node (CNode) component 330.

Specifically, the HClock 320 is a conventional hardware clock circuit adapted to generate a clock or "timestamp" having a known drift as specified by a manufacturer, e.g., the timestamp drifts a predetermined number of seconds in an hour or in a day, maximum. Thus, there is an error boundary defined by the maximum drift, wherein the term "drift" denotes the time that the timestamp drifts from an actual, real time. The CNode 330 is coupled in cooperating relation to (associated with) the HClock 320 and the write interception component 310. The CNode 330 is illustratively a software module configured to interact collectively with other CNodes 330 of other SRNs 300 to maintain a global clock and to provide an interface to the write interception component 310 to retrieve the current time.

In an illustrative embodiment, a set of CNodes that maintains a global clock comprises a clock group and the CNodes of a set of SRNs that maintains a consistency group belong to the same clock group. One CNode from among the clock group assumes a role of a master and the other CNodes assume the roles of slaves. Selection of the master and slave CNodes may be performed using conventional techniques known to those skilled in the art. In addition, determination of when a master CNode should be replaced may be performed using well-known techniques. Although the master CNode is illustratively described as contained within an SRN, it will be understood to those of skill in the art that the master CNode could also be contained within a separate computing unit exclusive of an SRN having write interception functionality.

Figure 4:
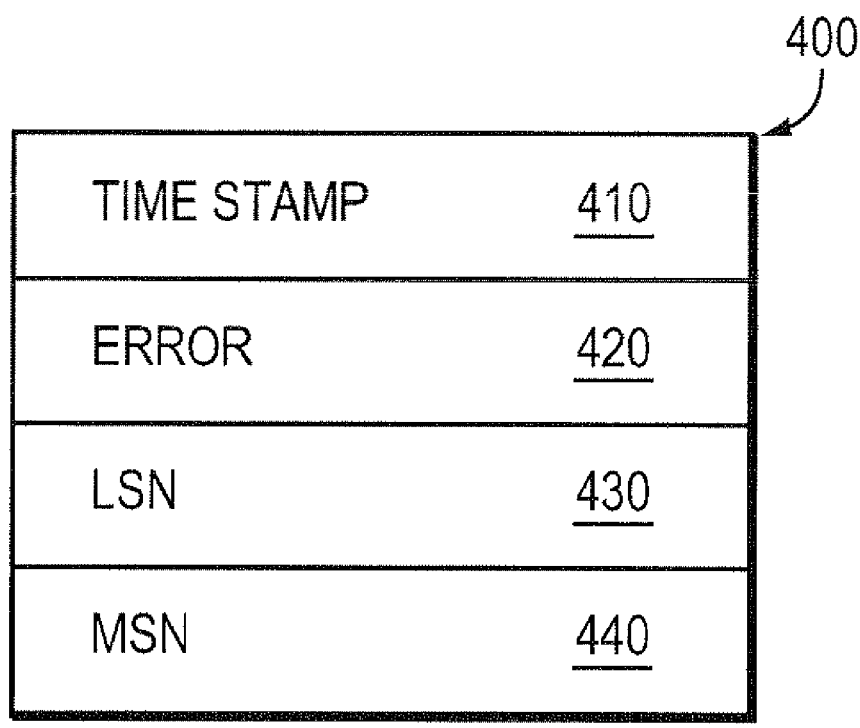
FIG. 4 is a schematic block diagram of a Time ID structure that may be advantageously used with the present invention.

Upon intercepting a write, the write interception component 310 of the SRN 300 records the write and queries (requests) its associated CNode 330 for an indication of the current time so that it can time stamp the intercepted write. In response, the CNode generates (prepares) and returns a Time Identifier (ID) data structure configured to describe the current time. FIG. 4 is a schematic block diagram of a Time ID structure 400 that may be advantageously used with the present invention. The Time ID structure 400 illustratively contains a timestamp field 410, an error field 420 (the maximum error of the timestamp), a local sequence number (LSN) field 430 and a major sequence number (MSN) field 440. The timestamp field 410 contains a timestamp, preferably chronological, with sufficient resolution (e.g., microsecond). The error field 420 contains a dynamically calculated value specifying a maximum error boundary of the timestamp. For example, assume the timestamp is t=2007, Jan 1 20:00:00: 0000 and the error is 1000 (microseconds). An illustrative interpretation of the maximum error boundary is that the time may be lower or higher than the "correct" time in 500 microseconds, i.e., "real" time=[t−500 . . . t+500]. It will be understood to those skilled in the art that there may be other interpretations of the maximum error boundary such as, e.g., as "real" time=[t . . . t+1000], and those interpretations are covered by the present invention. The LSN field 430 contains a counter value that is incremented every time the CNode 330 is queried to return the current time and the MSN field 440 contains a counter value that increases in various low-frequency control events, such as master CNode replacement, master CNode restart, etc.

When initialized (e.g., as a master CNode restart or a master CNode replacement), the master CNode increments the MSN 440 and sets the LSN 430 to zero. Likewise when initialized (e.g., as a restart or when exiting a clock-loss state), the slave CNode (i) sets the LSN 430 to zero, (ii) sets its state to clock-loss (if not already in that state), (iii) performs an initial clock synchronization, as described herein, and (iv) upon successful completion of the initial clock synchronization (vi) sets its slave state to active.

Figure 5:
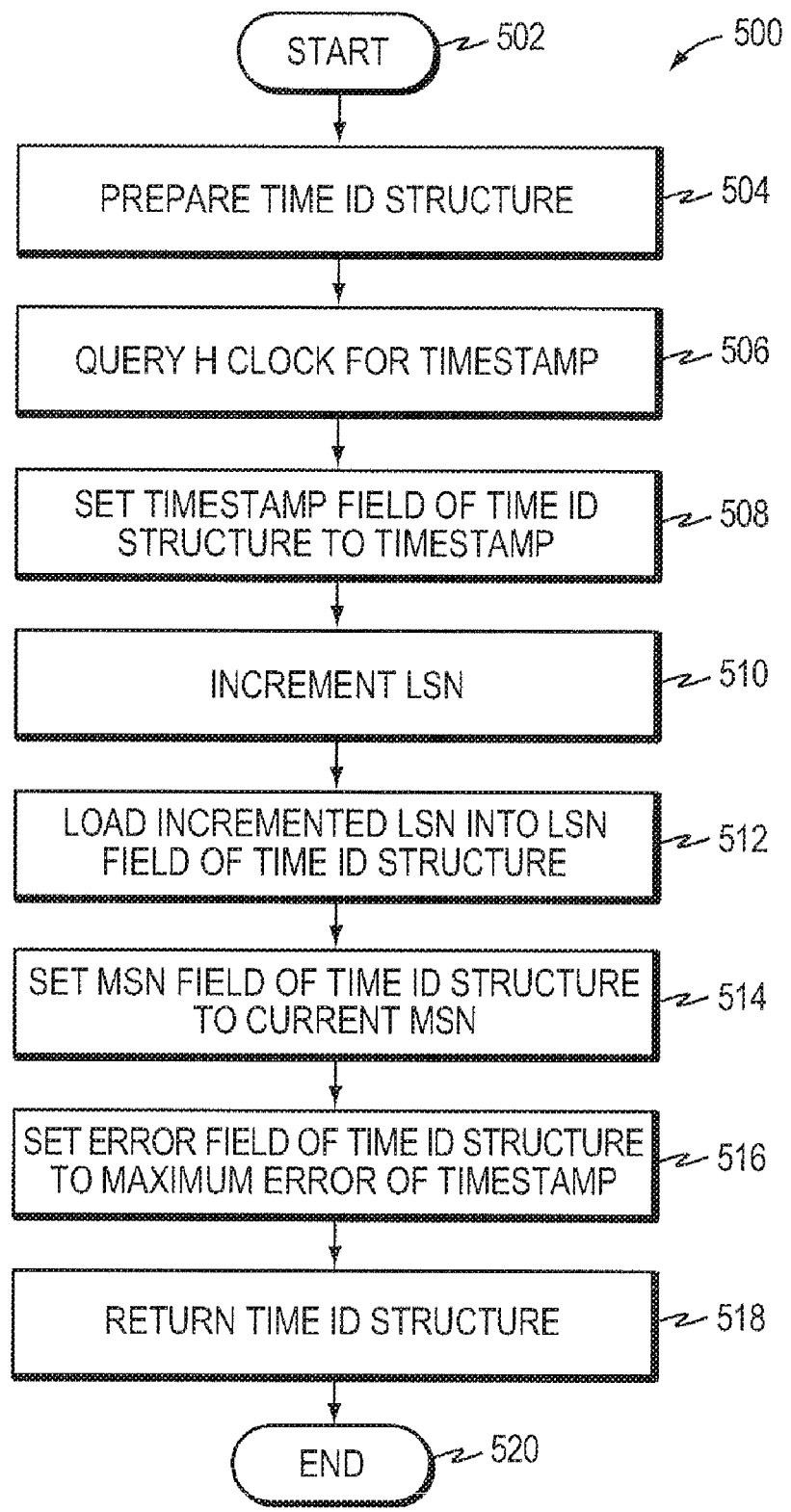
FIG. 5 is a flowchart illustrating a procedure for responding to a current time query in accordance with the present invention.

FIG. 5 is a flowchart illustrating a procedure 500 for responding to a current time query in accordance with the present invention. In an illustrative embodiment, the steps of the procedure 500 are performed atomically by a CNode 330, e.g., the master CNode, in response to its associated write interception component 310 issuing a query for the current time. The procedure 500 starts at Step 502 and proceeds to Step 504 where the master CNode prepares a Time ID structure 400 to be returned to the write interception component. In Step 506, the master CNode queries its HClock 320 for the timestamp and, in Step 508, sets the timestamp field of the Time ID structure to the timestamp. In Step 510, the master CNode increments the LSN and, in Step 512, loads the incremented LSN into the LSN field 430 of the Time ID structure 400. In Step 514, the master CNode sets the MSN field 440 of the Time ID structure to the current MSN. In Step 516, the master CNode sets the error field 420 of the Time ID structure 400 to the maximum error of the timestamp, e.g., zero (the master clock is considered the accurate clock) and, in Step 518, returns the Time ID structure 400 to the write interception component 310. The procedure then ends at Step 520.

In an illustrative embodiment, a slave CNode maintains a notion of the current time through use of its HClock 320, considering the known drift of its timestamp, and time information retrieved from the master CNode. As for the latter, the slave CNode sends a clock synchronization request message to the master CNode to synchronize its notion of time with that of the master using, e.g., a clock synchronization message exchange over, e.g., the network. In response to receiving and uniquely identifying the clock synchronization request message, the master CNode queries its HClock and returns a response message to the slave CNode. Illustratively, the response message contains (i) the unique identification of the request message, (ii) the requested timestamp and (iii) the current MSN.

Figure 6:
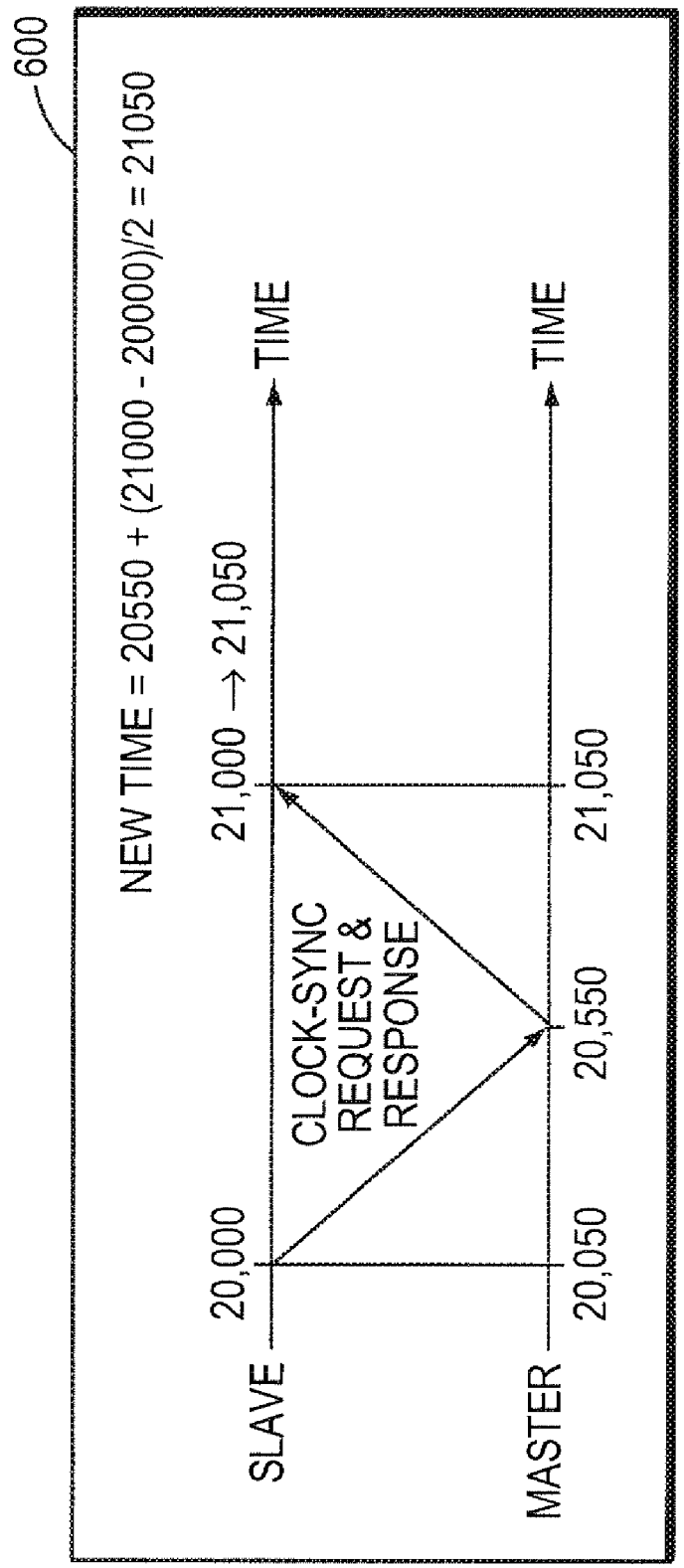
FIG. 6 is a chart depicting an illustrative embodiment of a clock synchronization message exchange between slave and master clock nodes (CNodes) in accordance with the present invention.

FIG. 6 is a chart depicting an illustrative embodiment of a clock synchronization message exchange 600 between slave and master CNodes in accordance with the present invention. Illustratively, all time values are in microseconds. At master CNode time equal to 20,050 and the slave CNode time equal to 20,000, the slave CNode sends a clock synchronization request message to the master CNode. Prior to sending the request message, the slave CNode samples its HClock and records a time of submission equal to 20,000. The request message takes 500 microseconds to arrive at the master CNode. The master CNode then queries its HClock and sends a response message to the slave CNode indicating that the master CNode time equals 20,550. The response message takes 500 microseconds to arrive at the slave CNode.

Upon receiving the response message, the slave CNode queries its HClock and obtains a time equal to 21,000. The slave CNode concludes that the roundtrip of the clock synchronization message exchange was 1,000 microseconds. The slave CNode can update its time by understanding that instead of 21,000, the current time is 20550+roundtrip/2=21050. The slave CNode can thus "virtually modify" the associated HClock 320 with the new current time value. As used herein, virtually modify denotes that the slave CNode does not actually modify the HClock; it just remembers the difference (delta) between its HClock time and the new current time.

The illustrative clock synchronization exchange embodiment described above ignores the error element of the message exchange because the slave CNode can relatively accurately measure the overall roundtrip. The measurement is illustratively pessimistic, taking into account the small drift of the HClock during the clock synchronization roundtrip exchange. However, it is noted that the slave and/or master CNodes do not measure the durations of the clock synchronization request and response messages, as separate values. In the above example, there is symmetry; each of the request and response messages took 500 microseconds. However, in realworld networking, such symmetry cannot be assumed. In theory, the request could take approximately zero microseconds and the response could take approximately 1000 microseconds, vice-versa, or anything in between.

Figure 7:
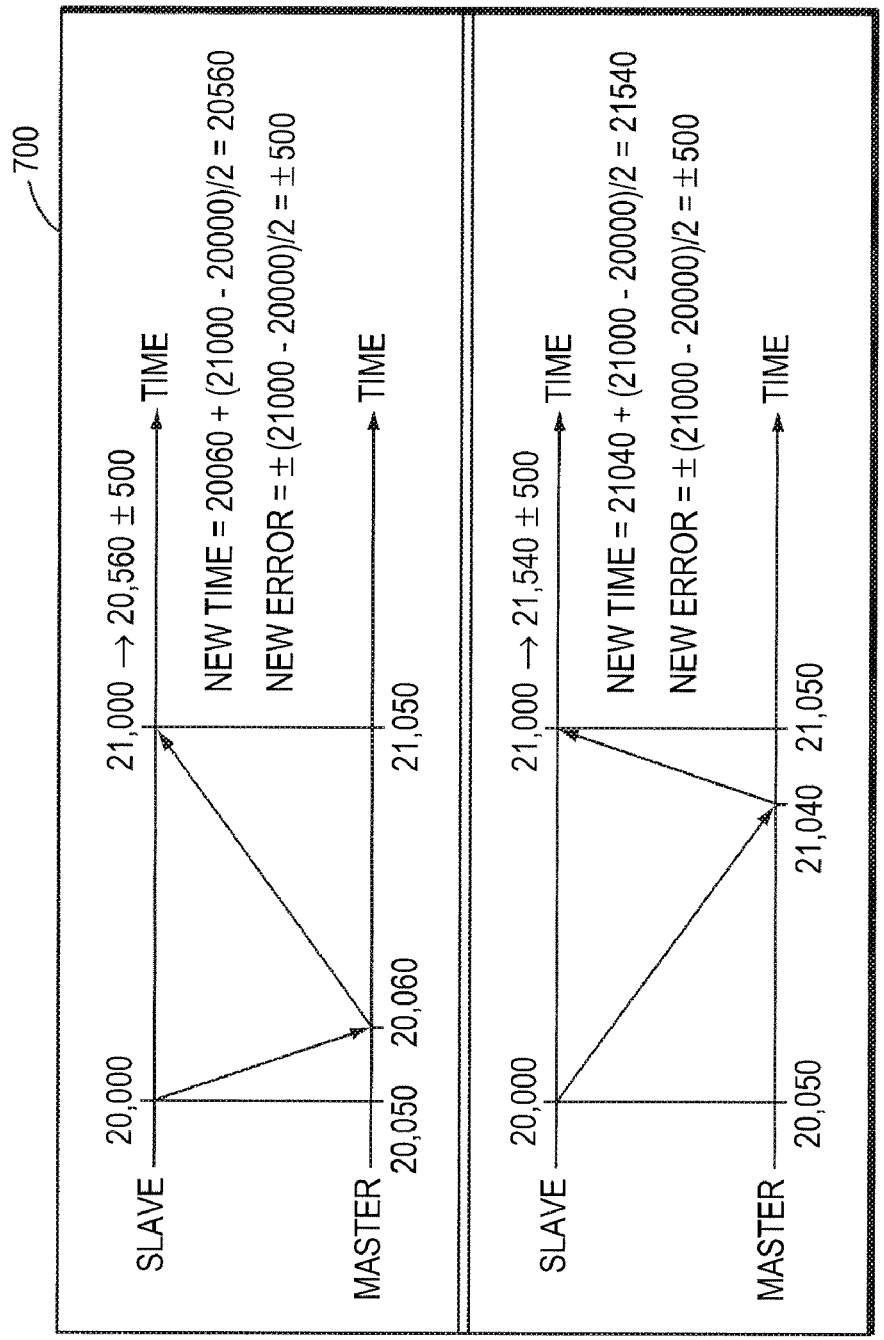
FIG. 7 is a chart depicting alternate illustrative embodiments of a clock synchronization message exchange between slave and master CNodes in accordance with the present invention.

FIG. 7 is a chart depicting alternate illustrative embodiments of a clock synchronization message exchange 700 between slave and master CNodes in accordance with the present invention. As described above in connection with FIG. 6, all time values are illustratively in microseconds. However, in FIG. 7, the new slave CNode times are each subject to an initial error of ±roundtrip/2. More accurately, the time is subject to an error of ±(roundtrip+drift (roundtrip))/2.

As noted, a slave CNode maintains a notion of the current time through use of its HClock 320, considering the known drift of its timestamp, and time information retrieved from its message exchange with the master CNode. To that end, the slave CNode virtually modifies the HClock with the new current time value, as described above with respect to FIG. 6. In addition, the slave CNode records the initial error dictated by the roundtrip of the previous clock-synchronization message exchange of FIG. 7 (e.g., ±500). Assume that the write interception component 310 associated with the slave CNode issues a query for the current time, say, X microseconds after that previous message exchange completed. Therefore, with reference to procedure 500 (FIG. 5) and, in particular, to Step 516, the slave CNode sets the error field 420 of the Time ID structure 400 to the initial error plus an accumulated error derived from the known HClock drift within those X microseconds.

Figure 8:
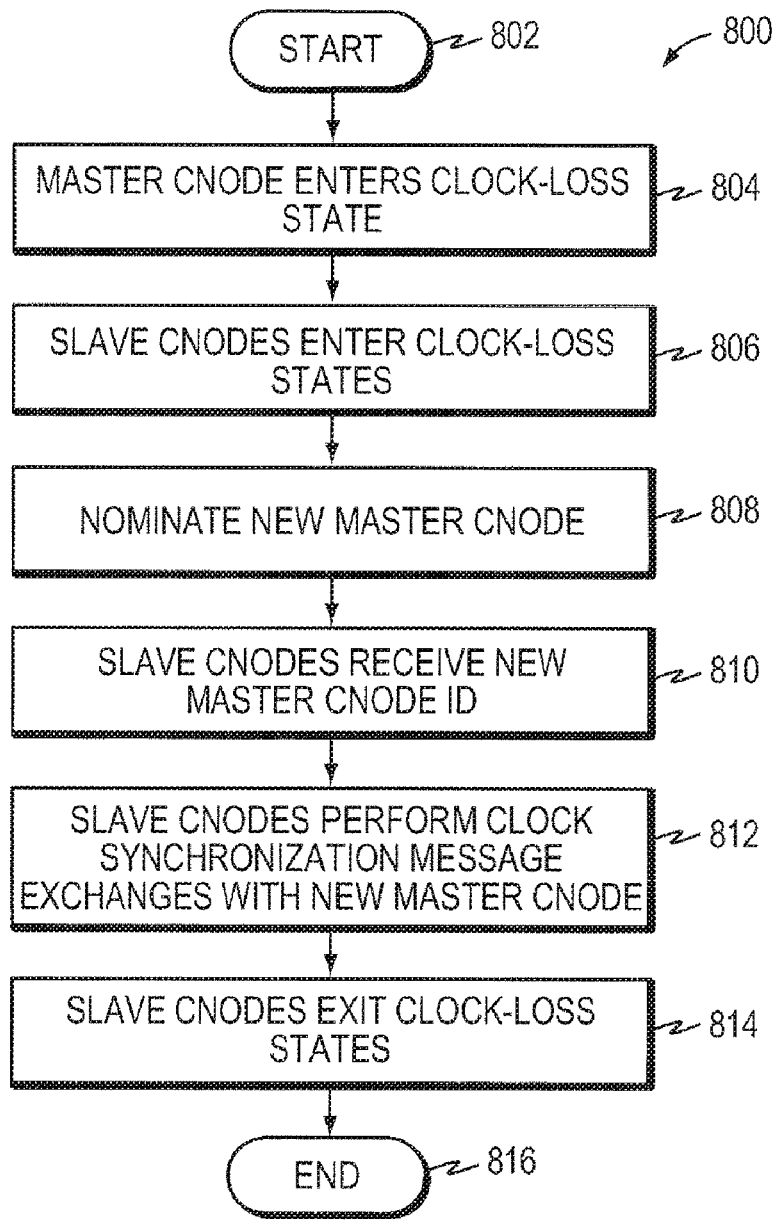
FIG. 8 is a flowchart illustrating a procedure for replacing a master CNode with a new master CNode in accordance with the present invention.

A situation may arise where it is desired to nominate a new master CNode, e.g., where the SRN 300 of the existing master CNode fails and becomes unavailable or is unreachable by the other slave CNodes. FIG. 8 is a flowchart illustrating a procedure for replacing a master CNode with a new master CNode in accordance with the present invention. The procedure 800 starts at Step 802 and proceeds to Step 804 where the master CNode is "demoted" (e.g., to a slave CNode) and, as such, enters a clock-loss state. All slave CNodes are then notified that the existing master CNode is no longer a master and, as such, enter clock-loss states in Step 806. In Step 808, the new master CNode is nominated with a MSN higher than the previous one and, in Step 810, the slave CNodes receive the new master CNode identification (ID). In Step 812, the slave CNodes perform clock synchronization message exchanges with the new master CNode and, in Step 814, exit their clock-loss states. The procedure then ends at Step 816.

It should be noted that the replacement (i.e., Master Replacement) procedure described above assumes all CNodes are responsive. In the event that the existing master CNode or any of the existing slave CNodes is not responsive, there is a danger they are "alive" and could generate further Time ID structures. If such Time ID structures are created after a new master CNode is nominated, the replication service could be totally corrupted. Hence, solutions used to expel the non-responsive CNodes, such as conventional solutions used by computer clusters, must be applied if it is desired to continue the process of nominating a new master CNode. One possible solution, for example, is to contact all target domain components associated with the non-responsive CNodes, and instruct them to expel those CNodes.

In an illustrative embodiment, the MSN 440 of the Time ID 400 is used for Master Replacement to enable replication components to distinguish time information. For example, logic within the replication components is configured to determine which of two Time IDs ($TID_1$, $TID_2$) is later. A determination based on timestamp (and error) only is insufficient, particularly if $TID_1$ was generated when CNode A was master and $TID_2$ was generated when CNode B was master, because the HClocks of the CNodes may not be synchronized. Since the MSN is monotonically increasing each time a new master CNode is nominated and since Master Replacement requires transient clock-loss states in all CNodes, then comparison of two Time IDs with different MSNs results in the Time ID having the larger MSN being later, regardless of their timestamps.

While there have been shown and described illustrative embodiments of an advanced clock synchronization technique adapted for use with a replication service in a data backup and recovery storage environment, it is to be understood that various other adaptations and modifications may be made within the spirit and scope of the present invention. For example, it should be noted that the present invention does not utilize a conventional clock synchronization technique, such as NTP and SNTP, to synchronize notions of time between the master and slave CNodes, primarily because of the latencies incurred when traversing large geographical areas. As an example, conventional clock synchronization requires a master that maintains a "real" clock and slaves that "trust" the master's clock, whether that clock is accurate or not. In response to a time request issued by a slave, the master returns the current time of its master clock to the slave, which changes its slave clock accordingly. However, requests and responses for time that traverse large geographical areas incur latencies, e.g., a predetermined number of seconds to propagate the request to the master and the same number of seconds to propagate the response to the slave, which translate to a basic error that is dealt with statistically. The present invention, on the other hand, utilizes a maximum error boundary that is dealt with theoretically.

For instance, assume the master CNode described herein returns a time of 11:13 and, with error, the slave CNode records a time of 11:13+/−1 second. The slave CNode knows that its clock is not very accurate and that it drifts 1 second every minute. Assume 1 minute passes without the slave CNode issuing a time query to the master CNode; as such, the time is 11:14+/−1.5 secs. Thus, the drift and error increase until the slave CNode again issues a time query to the master CNode. Because it knows the drift of its clock, the slave CNode compensates for it accordingly. Applying such a clock (compensation) synchronization technique to consistent replication environments is an notable aspect of the present invention.

The foregoing description has been directed to specific embodiments of this invention. It will be apparent, however, that other variations and modifications may be made to the described embodiments, with the attainment of some or all of their advantages. For instance, it is expressly contemplated that the processes, modules and/or components described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to provide clock synchronization for use with a replication service in a data backup and recovery storage environment, comprising:

a first source replication node of a plurality of source replication nodes (SRNs) configured to couple to one or more target storage systems of a plurality of target storage systems over a network, the plurality of SRNs configured to replicate storage requests on the one or more target storage systems, wherein a first SRN of the plurality of SRNs comprises a first write interception component, a first hardware clock component (HClock) configured to generate a timestamp, and a first clock node component (CNode) in cooperating relation to the first write interception component and the first HClock, the first CNode configured to, interact with a second CNode of a second SRN of the plurality of SRNs to elect the first CNode as a master CNode, synchronize a second HClock of the second SRN to the first clock HClock by the second SRN querying a current time from the master CNode, provide the second CNode with the timestamp from the first HClock in response to the query, and modify the second HClock according to the timestamp and an error boundary of the second HClock; and wherein at least one of the CNodes is configured to generate a time identifier (ID) data structure configured to store at least one of the timestamp and the error boundary.

2. The system of claim 1 wherein the storage requests are write operations.

3. The system of claim 2 wherein synchronization orders the write operations.

4. The system of claim 1 wherein each SRN comprises a write interception component configured to intercept the storage requests, each SRN configured to replicate the storage requests to the one or more target storage systems.

5. The system of claim 4 wherein the error boundary is defined by a maximum drift of the timestamp.

6. The system of claim 1 wherein the master CNode comprises a software module configured to interact collectively with each other CNode of the plurality of SRNs to provide an interface to retrieve the current time.

7. The system of claim 1 wherein the time (ID) data structure further comprises a local sequence number (LSN) field containing a counter value that is incremented when the first CNode is queried to return the current time.

8. The system of claim 1 wherein the master node clock component is further configured to set an error field of the time ID structure to zero.

9. The system of claim 1 wherein the time ID data structure further comprises:

a major sequence number (MSN) field containing a counter value that increases in response to one or more low-frequency control events.

10. The system of claim 9 wherein the one or more low-frequency control events comprises a master CNode replacement and a master CNode restart.

11. The system of claim 1 further comprising:

one or more hosts configured to execute applications to issue the storage requests to access data containers exported by the plurality of source storage systems; and a switching fabric configured to couple the one or more hosts to the plurality of source storage systems.

12. The system of claim 11 wherein a second write interception component resides in one of a host of the one or more hosts, the switching fabric and a source storage system.

13. The system of claim 12 wherein the host is a general-purpose computer and wherein the second write interception component is embodied as a device driver of the general-purpose computer.

14. The system of claim 12 wherein the switching fabric comprises a network switch and wherein the write interception component is embodied as a software module of the network switch.

15. The system of claim 12 wherein the source storage system comprises a virtualization system and wherein the first write interception component is embodied as a software module disposed over the virtualization system.

16. A method for providing clock synchronization for use with a replication service in a data backup and recovery storage environment, comprising:

coupling a first replication node of a plurality of source replication nodes (SRNs) to one or more target storage systems of a plurality of target storage systems over a network;

replicating a storage requests on the one or more target storage systems by the plurality of SRNs, wherein a first SRN of the plurality of SRNs comprises a first write interception component, a first hardware clock component (HClock) configured to generate a timestamp, and a first clock node component (CNode) in a cooperating relation to the first write interception component and the first HClock;

electing the first CNode as a master CNode;

synchronizing a second HClock of a second SRN of the plurality of SRNs to the first HClock by the second SRN querying a current time from the master CNode;

providing a second CNode of the second SRN with the timestamp from the first HClock;

modifying the second HClock according to the timestamp and an error boundary of the second HClock; and generating, by at least one of the CNodes, a time identifier (ID) data structure configured to store at least one of the timestamp and the error boundary.

17. The method of claim 16 further comprising replicating the storage requests to the one or more target storage systems.

18. The method of claim 16 further comprising defining the error boundary by a maximum drift of the timestamp.

19. The method of claim 16 further comprising interacting by the first CNode collectively with each other CNode of the plurality of SRNs to provide an interface to retrieve the current time.

20. The method of claim 16 further comprising incrementing a counter value of a local sequence number (LSN) field of the time ID data structure when the first CNode is queried to return the current time.

21. The method of claim 16 further comprising incrementing a counter value of a major sequence number (MSN) field of the time ID data structure in response to one or more low-frequency control events.

22. A computer readable storage media containing executable program instructions for execution by a processor, the computer readable storage media comprising:

program instructions that operatively couple a first source replication node of a plurality of source replication nodes (SRNs) to one or more target storage systems of a plurality of target storage systems over a network, wherein a first SRN of the plurality of SRNs comprises a first write interception component, a first hardware clock (HClock) configured to generate a timestamp, and a first clock node (CNode) in cooperating relation to the first write interception component and the first HClock;

program instructions that elect the first CNode as a master CNode;

program instructions that synchronize a second HClock of a second SRN of the plurality of SRNs to the first HClock by the second SRN querying a current time from the master CNode;

program instructions that provide a second CNode of the second SRN with the timestamp from the first HClock;

program instructions that modify the second HClock according to the timestamp and an error boundary of the second HClock; and program instructions that generate, by at least one of the CNodes, a time identifier (ID) data structure configured to store at least one of the timestamp and the error boundary.

* * * * *

UNITED STATES PATENT AND TRADEMARK OFFICE
CERTIFICATE OF CORRECTION

PATENT NO. : 8,150,800 B2  
APPLICATION NO. : 11/692659  
DATED : April 3, 2012  
INVENTOR(S) : Erez Webman et al.

Page 1 of 1

It is certified that error appears in the above-identified patent and that said Letters Patent is hereby corrected as shown below:

In the Specifications:

In col. 5, line 1 should read:  
~~Is~~ FIG. 2 is a schematic block diagram of a storage system In col. 5, line 45 should read:  
Information. However, as illustratively described herein, ~~is~~

In the Claims:

In col. 11, line 18 should read:  
~~first clock~~ HClock by the second SRN querying a In col. 12, line 17 should read:  
Coupling a first <u>source</u> replication node of a plurality of source In col. 12, line 21 should read:  
Replicating ~~a~~ storage requests on the one or more target Signed and Sealed this  
Twenty-fifth Day of June, 2013

Teresa Stanek Rea  
*Acting Director of the United States Patent and Trademark Office*